Patented June 12, 1923.

1,458,650

UNITED STATES PATENT OFFICE.

VICTOR MORITZ GOLDSCHMIDT, OF CHRISTIANIA, NORWAY.

PROCESS FOR THE PRODUCTION OF CALCIUM CHLORIDE.

No Drawing. Application filed January 13, 1922. Serial No. 529,062.

*To all whom it may concern:*

Be it known that I, VICTOR MORITZ GOLDSCHMIDT, a subject of the King of Norway, residing at Christiania, Norway, have invented certain new and useful Improvements in Processes for the Production of Calcium Chloride; and I do hereby declare the following to be a full, clear, and exact description of the invention, such as will enable others skilled in the art to which it appertains to make and use the same.

This invention has for its object a process for the production of calcium chloride. Anhydrous calcium chloride is usually produced from calcium chloride hydrate by heating. On account of the great consumption of fuel necessary, the production of the anhydrous calcium chloride in this manner is, however, comparatively expensive, and it is also very difficult by these means to get the last traces of water removed so that the chloride may be used for production of calcium metal or of calcium alloys.

The present invention has for its object a process by which it is possible by simple means and with small costs to produce anhydrous or practically anhydrous calcium chloride from burnt lime or other calcium oxide material.

By this process the fact known from the scientific literature is utilized that calcium oxide may be caused to react with chlorine gas, producing calcium chloride and oxygen according to the following equation:

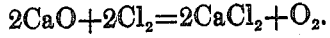

According to the known statement in the literature the reaction has to take place at the glowing temperature. However, until now no proposal has been made for the utilization of the said reaction in the manufacture of calcium chloride. It has only been suggested to introduce chlorine gas into a fused mass containing calcium-oxide. Evidently nobody has though it possible to carry out the reaction with calcium oxide in solid state, if a technically satisfactory utilization of chlorine is to be obtained. It has apparently been assumed that the reaction, in analogy to that of other light metal oxides, for example magnesium-oxide, will be finished at an unfavorable equilibrium so that a gas rich in chlorine would escape.

Apart from the technical difficulties in connection with the escaping chlorine bearing gas, this would make the process economically unexecutable.

The applicant has now made the surprising observation that it is possible to attain a practically complete utilization of chlorine and therefore a practically chlorine-free exhaust gas if the reaction is carried out in the temperature-interval of 350–650° C.

The transformation of oxide in chloride takes place without the employment of reducing agents such as carbon or phosgene to bind the disengaged oxygen and without the use of fused reaction mass. Hereby the difficulties are avoided which are a consequence of the incrustation of the calcium-oxide with fused calcium chloride.

In accordance with this observation calcium chloride is produced according to the present invention by conducting the chlorine gas in contact with calcium oxide at temperatures between 350 and 650° C. at which the reaction takes place with substantially solid materials. Hereby it is possible to produce directly from burnt lime, which may be obtained in an absolutely anhydrous condition, completely anhydrous calcium chloride, as well as an exhaust gas practically free from chlorine.

The process may suitably be carried out by using the counter-current principle. During the progress of the reaction the temperature may be regulated in different manners, for example by regulating the supply of chlorine.

By the execution of this process pure calcium oxide as well as mixtures containing calcium oxide may be used. Thus it has been proved that charges containing calcium carbonate may be used with especially great advantages.

Because the reaction, as mentioned above, has a very complete progress, a complete utilization of the chlorine gas will be possible, but in addition thereto it will be possible to carry out the chlorination with the aid of a very poor chlorine gas diluted for example with air such as is the case with respect of chlorine gas obtained from the apparatuses for the electrolysis in fused bath. The completeness of the reaction makes it even possible to utilize it for the removal of the small or great percentage of chlorine from gases.

By the technical execution of the process one may proceed in different manners, making use of such apparatuses and measures which are ordinarily employed and previously proposed for the carrying out of reactions between gases and solid substances on an industrial scale. Thus stationary as well as rotating apparatuses or apparatuses provided with stirrers may be made use of. By the carrying out of the process one can work with melted materials, but the chlorination is carried out most advantageously at temperatures where the melting of the reaction mixture or of the products does not take place, because the working of the apparatus takes place in the best manner with a wholly unmelted charge.

According to the nature of the calcium oxide material which is to be chlorinated, the construction of the used apparatuses and the working conditions, the materials may be used in the form of a powder or in more coarse-grained state. By suitable adaption of the quantity of the supplied chlorine gas in relation to the quantity of heated charge, through which the chlorine gas resp. the gaseous reaction products pass before the gases are let out in open air, one can attain a wholly quantitative utilization of the chlorine gas and avoid losses of chlorine and contamination of the atmosphere with the chlorine gas.

With a starting concentration of chlorine equal to 90 volume per cent and a reaction mass of calcium oxide with a grain-size of 1 mm. and with a length of the reaction space of about 70 mm., kept at 550° C., a completion of the reaction is obtained so that the exhaust gas contains less than 0.01 per cent of chlorine.

Such complete utilization of the chlorine gas is attained in a most advantageous manner by using the counter-current principle as mentioned above.

The calcium chloride obtained by the process can be utilized for the most different purposes, for example for drying, but is in a particularly prominent degree adapted to the electrolytical production of calcium metal or calcium alloys. In carrying out the process for this purpose the chlorine gas obtained by the electrolysis may be used with advantage for the chlorination according to the present process, because it is possible, as mentioned above, to use with advantage a much diluted chlorine gas.

I claim:

1. Process for the production of calcium chloride consisting in reacting upon a solid unfused mass comprising the calcium oxide with gas containing free chlorine in the absence of substantial amounts of reducing substances at a temperature between 350 and 650° C.

2. Process according to claim 1 in which calcium oxide is reacted upon with chlorine gas substantially diluted with inert gases.

In testimony that I claim the foregoing as my invention, I have signed my name in presence of two subscribing witnesses.

VICTOR MORITZ GOLDSCHMIDT.

Witnesses:
 MOGUN BUGGE,
 RANDI GUNDERSON.